United States Patent [19]

Ledebuhr et al.

[11] Patent Number: 4,659,013
[45] Date of Patent: Apr. 21, 1987

[54] SPRAY UNIT FOR CONTROLLED DROPLET ATOMIZATION

[75] Inventors: Richard L. Ledebuhr, Haslett; Gary R. Van Ee, Williamston, both of Mich.

[73] Assignee: Board of Trustees of Michigan State Univ., East Lansing, Mich.

[21] Appl. No.: 671,521

[22] Filed: Nov. 14, 1984

[51] Int. Cl.⁴ .................. A62C 1/12; B05B 9/06; B05B 1/20; F04D 5/00

[52] U.S. Cl. ............................ 239/8; 239/77; 239/166; 415/54

[58] Field of Search ............ 239/77, 166, 167, 168, 239/223, 224, 8; 415/54

[56] References Cited

U.S. PATENT DOCUMENTS

| | | | |
|---|---|---|---|
| 1,980,427 | 11/1934 | Parker | 299/46 |
| 2,157,416 | 5/1939 | Kjos | 261/91 |
| 2,321,792 | 6/1943 | Bowie | 299/140 |
| 2,590,400 | 3/1952 | Gollnick | 299/41 |
| 2,995,307 | 8/1961 | McMahon | 239/161 |
| 3,023,970 | 3/1962 | Knoell | 239/167 |
| 3,053,314 | 9/1962 | McGillis | 158/77 |
| 3,055,594 | 9/1962 | Nansel | 239/161 |
| 3,063,644 | 11/1962 | Bals | 239/77 |
| 3,252,656 | 5/1966 | Greenwood | 239/77 |
| 3,279,427 | 10/1966 | Clancy | 118/317 |
| 3,362,469 | 1/1968 | Berner | 165/122 |
| 3,369,754 | 2/1968 | Wolford | 239/8 |
| 3,385,511 | 5/1968 | Wentling | 230/134 |
| 3,396,651 | 8/1968 | Kamiya | 98/33 |
| 3,552,652 | 1/1971 | Greenwood | 239/77 |
| 3,599,866 | 8/1971 | Bolton | 239/8 |
| 3,666,177 | 5/1972 | Mencacci | 239/77 |
| 3,791,582 | 2/1974 | Mencacci | 239/222.17 |
| 3,793,762 | 2/1974 | Stains | 43/124 |
| 3,970,411 | 7/1976 | Wallman | 416/178 |
| 4,014,625 | 3/1977 | Yamamoto | 415/54 |
| 4,026,469 | 5/1977 | Frankel | 239/78 |
| 4,172,557 | 11/1979 | Davis | 239/77 |
| 4,221,332 | 9/1980 | Bals | 239/223 |
| 4,222,523 | 9/1980 | Bals | 239/216 |
| 4,225,084 | 9/1980 | Bals | 239/223 |
| 4,337,895 | 7/1982 | Gallen | 239/8 X |
| 4,353,505 | 10/1982 | Kinder | 239/167 |
| 4,450,755 | 5/1984 | Catan | 98/36 |
| 4,546,723 | 5/1985 | Hesse | 239/77 |

FOREIGN PATENT DOCUMENTS

| | | |
|---|---|---|
| 291796 | 5/1968 | Australia ............... 239/77 |
| 37464 | 3/1965 | Fed. Rep. of Germany . |
| 411599 | 4/1966 | Fed. Rep. of Germany . |
| 1194031 | 5/1959 | France . |
| 4634131 | 9/1967 | Japan . |
| 52-6110 | 1/1977 | Japan ............... 415/203 |
| 56-165794 | 12/1981 | Japan . |
| 198358 | 6/1924 | United Kingdom . |
| 809676 | 3/1959 | United Kingdom . |
| 1017115 | 1/1966 | United Kingdom . |

OTHER PUBLICATIONS

Brochure entitled "Automatic Mist Sprayers", printed 4/83, distributed to respondents to Apr., 1984, Advertisement in "American Vegetable Grower" Automatic Equipment Mfg. Co., Pender, Nebraska.

(List continued on next page.)

Primary Examiner—Andres Kashnikow
Assistant Examiner—Patrick N. Burkhart
Attorney, Agent, or Firm—Miller, Morriss & Pappas

[57] ABSTRACT

A spray unit and process for controlled droplet atomization in which a tangential vortex type fan with wide mouth passes operation from low-to-medium pressures at high volume, passes air through a throat in which controlled droplet atomization of spray material is being achieved prior to emission from the fan in a plane generally parallel to the flow of air. The flow of air sweeps the droplets into a parallel orientation in substantial avoidance of contact of the spray material on the fan parts, throat or mouth thereof and the airflow confines the continuous core of controlled droplets and projects the protected spray toward a target. The spray units are arranged to permit plural end-to-end adjacent articulated mounting with directional adjustment and flexible conduits for power at the individual units, including spray material delivery and power to lineal actuators and are carriage mounted on wheels for easy movement in the target area.

6 Claims, 11 Drawing Figures

OTHER PUBLICATIONS

Fan Characteristic Relating to Orchard Sprayer Design, O. D. Hale, Paper No. 2, 1975, Nov. 12—N.I.A.E. Subject Day, 13 pages.

New Research Results in Pesticide Application, Horst Goehlich, 0955/pp. 1-5, (Technische Universitat Berlin), 20 pages, undated.

What You Should Know About Air-Carrier Spraying, Food Machinery and Chemical Corp., John Bean Div., Copyright 1956, 6 pages.

How to Set Your Air-Carrier Sprayer (Reprint from "What You Should Know About Air-Carrier Spraying"), Food Machinery and Chemical Corp., copyright 1956.

Micro Max Rotary Spray Nozzle, Micron Corp., Texas, 4 pages, undated.

The Cross-Flow Concept—How It was Developed, Rex Sharp, article published in "The Grower", Jun. 5, 1980, 2 pages.

Mistblower Range, published by Hardi, Inc., Canada, 8 pages, undated.

Micronair (Aerial) Ltd., Specialized Ground Spraying Equipment, 6 pages, undated (England).

Advertisement from Rear's Mfg. Co., Eugene, Oregon, "We're Here and We're Here to Stay", 1 page, undated.

Advertisement from "American Vegetable Grower", Apr. 1984, The Automatic Mist Sprayer . . . Why Pay More and Get Less?", 1 page.

NIAE Fan Sprayer, published in "Horticulture Industry", Jan. 1980, 2 pages.

B.C.P.C. Symposium on Controlled Drop Application Apr. 1978, "Reduction of Active Ingredient Dosage by Selecting Appropriate Droplet Size for the Target, E. J. Bals, F. I. Agr. E., Micron Sprayer Limited, pp. 101-106.

Technical Manual—Orchard and Row Crop Air Sprayers, F. E. Myers & Bro. Co., Ohio, Copyright 1964, 100 pages.

Tangentail Fan Design, Reprinted from "Engineering Materials and Design", Oct. 1965, Firth Cleveland Fans Ltd., England, 4 pages.

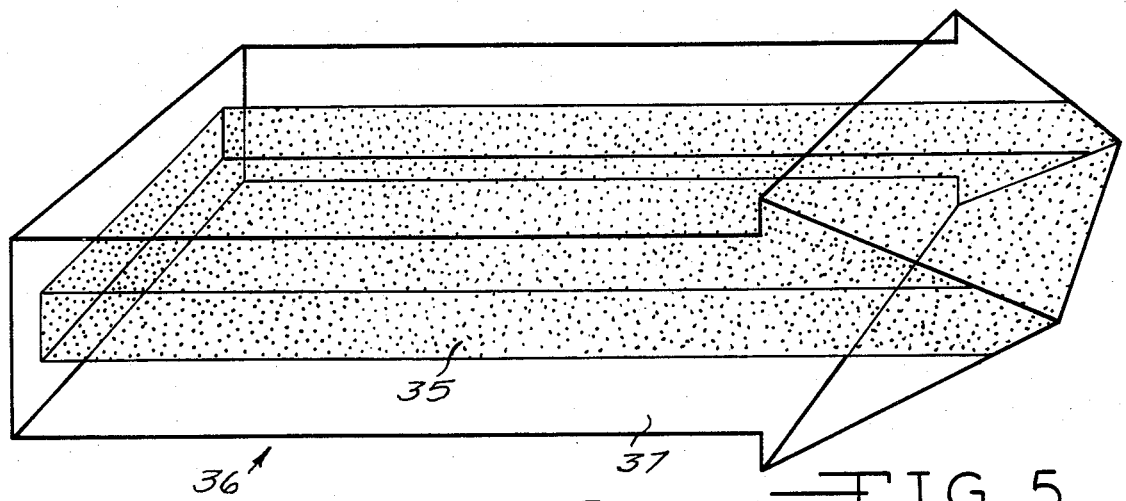
FIG. 5
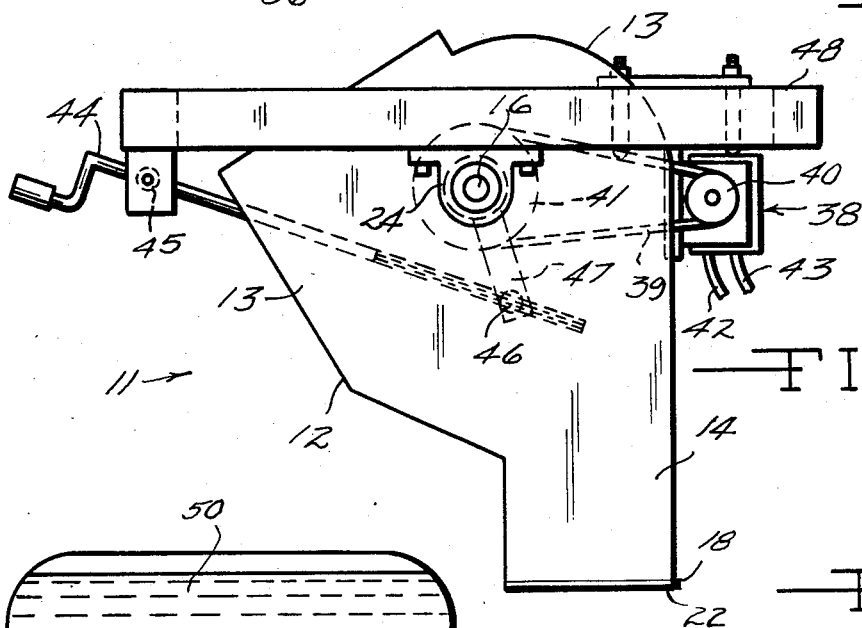
FIG. 6
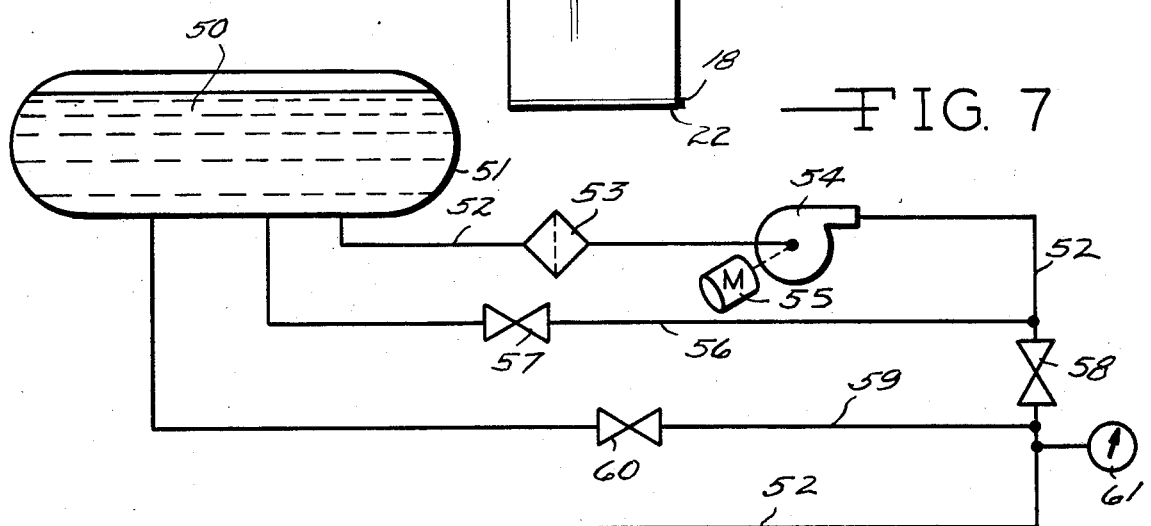
FIG. 7
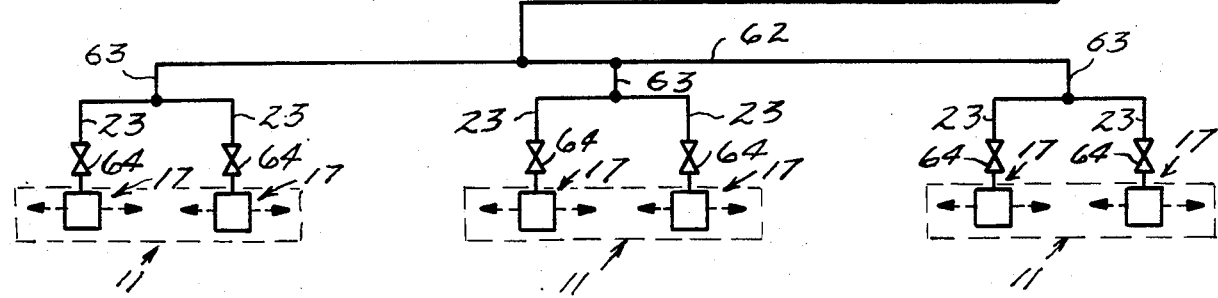

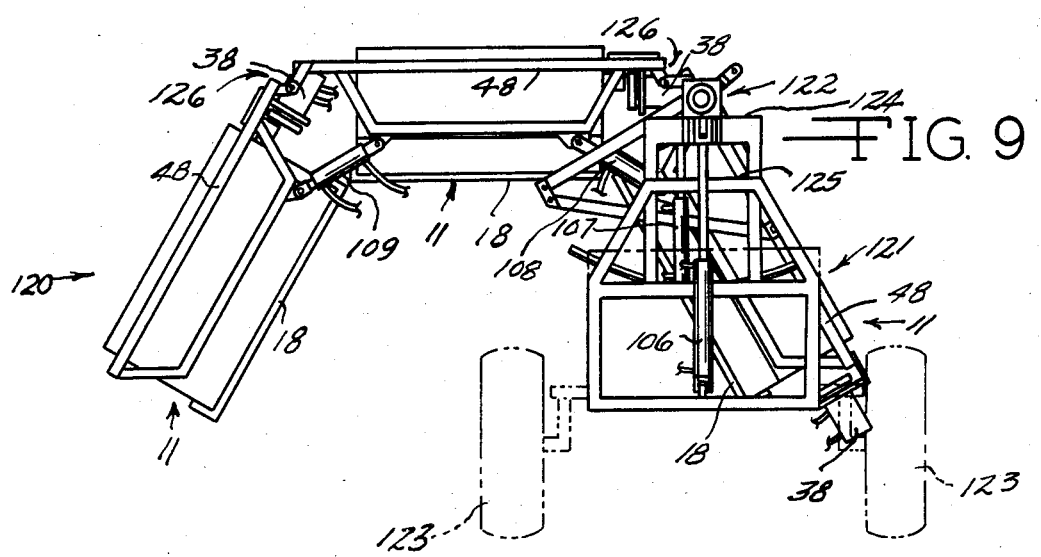
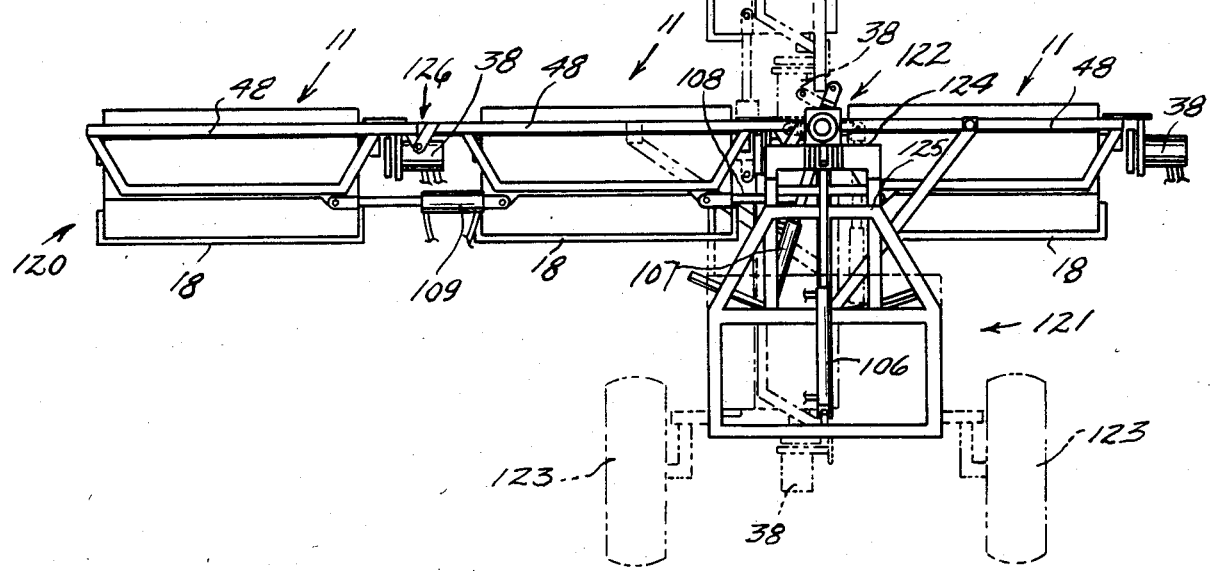

SPRAY UNIT FOR CONTROLLED DROPLET ATOMIZATION

The present invention is an apparatus and procedure for driving or projecting controlled droplet atomization in agricultural applications. More particularly, the present invention is an apparatus facilitating improved low-to-medium velocity projection of spray generated by controlled droplet atomization of a chemically active ingredient as, for example, in fungicides, herbicides, bacteriostats, pesticides, plant nutrients and other materials applied to crops, ground and foliage for agricultural and horticultural beneficiation.

Controlled droplet atomization, as exemplified in the work of Bals in U.S. Pat. Nos. 3,063,644, 4,221,332, 4,222,523 and 4,225,084 and others, has been available to the agricultural industry for a number of years and allows spraying equipment to project selectively sized droplets ranging from micron size to heavy raindrop size in crop applications. While this step forward was heralded as a means to reduce the volume of active ingredient required for a given area, and it suggested ideal particle or droplet size matched to the particular use or crop and the active ingredient, its full potential has not been completely realized because the application to the fields and crops required a means to drive or project the generated and uniform sized droplet spray to the subject crops without wide dispersion and "float" (dispersion migration from the spray target) which was the consequence of the existing spray and delivery means employed in the projection of the controlled droplet generated product.

Relatively high velocity devices were used and the consequent quick diffusion of the controlled droplet spray caused spray to be extensively wasted on nonagricultural targets. Efficient spraying did not result and expensive sprays were lost despite the advantage of droplet size selections.

Aircraft frequently have used controlled droplet atomization or generating equipment in dispersing agricultural sprays. Improved results were obtained with controlled droplet atomization since the droplet size could be selected to match the optimum application as contrasted with the prior known random size droplet systems. However, the introduction of the sized droplets into the highly turbulent air minimized the effective application to the specific target.

A wide variety of high velocity fans, turbines and air nozzles have been used for blowing mainly transversely across or through the plane of droplet generation from the generating heads of the controlled droplet atomizers with a consequent random dispersion of the droplets or particles to the point of causing a substantial missing of the target plants. The random trajectories of the limited spray particles adversely diffused the spray at emission from the fans, blowers or turbines. The air employed was high velocity air seeking maximum entrainment of spray and extended projection of the active ingredient. While for specific usage (for example in orchards), some of these projection techniques of high velocity usefully extended the controlled droplet application, these high velocity processes and apparatus were regarded as falling short of maximizing contact of active ingredient to the crop target without substantial loss of active ingredient to the environment and damage to the crops. The high velocity application of active ingredient resulted in masking by the facing foliage and prevented application of spray to both leafy surfaces, for example. This was especially apparent in orchards but was equally apparent when projected vertically downward against row and ground crops, shrubs and bushes. Loss of active ingredient to the ground and nontargeted environment was ever present.

In the belief that better and more efficient projection could be achieved by earlier entrainment of the generated and sized droplets, others designed fans of extremely high velocity and bled the controlled droplets into the eye of the impeller or blower units so that the droplets were agitated and whirled by the fast-moving rotors and blades under fast turbulent air conditions in which a somewhat homogenous mix of turbulent air and particles were emitted from the sprayer. Whether from differences in specific gravity, or from centrifugal forces inherent in the system, an emission resembling an expanding fog occurred at the blower nozzles. In such systems, some of the spray material and active ingredient remained, after frictional projection in contact with the fans, turbines, blowers and ducts, and were found coating and caking the interior surfaces of the apparatus. No satisfactory solution was forthcoming and the high velocity projection of controlled droplet sprays was never the success originally anticipated in achieving the coverage and efficiency advantages projected for controlled droplet atomization.

The relatively low velocity, high volume, crossflow vortex fans, sometimes called tangential fans, have been known to us at least since the designs of Motier in 1892 for mine ventilation in France. Later, Eck and Laing, German inventors, extended the usage to fan heaters and small appliances. Typical was the work of Nikolaus Laing in U.S. Pat. No. 3,232,522. Yamamoto in U.S. Pat. No. 4,014,625 further extends the knowledge of the transverse flow fan. While finding application in agriculture as in harvesting, separation and processing applications, these high volume, low-to-medium velocity fans had never been considered for spraying. Conventional spraying had moved in the direction of high velocity entrainment and dispersion. The higher the particle speed, the better the "throw" at all particle size levels. This high velocity fascination ignored the consequent highly turbulent mixes of air and particles within the fast-moving mass. Freed from confinement, diffusion of the spray particles was inevitable at emission.

The present invention extends the controlled droplet atomization or generation to its fuller potential by a wholly nonobvious route using an apparatus in which the controlled droplet atomizers are combined with the crossflow vortex fan to entrain and columnize the drops by an achievement of encapsulation of the droplet product or mist in a moving wrapper of nonturbulent air assuring an orientation of parallel and nonrandom movement of the particles or droplets and with substantially no impingement of spray materials with the surfaces of the blower apparatus and ducting. The apparatus and the procedure of the present invention generates the uniformly sized droplets in a plane parallel to the ducted delivery of high volume, low-to-medium velocity air in a wide mouthed orifice or throat. The atomizers or generators are located upstream of the lips of the emission mouth or orifice of the crossflow vortex fan and the droplets are dispersed in complete avoidance of impingement with the ducting. The moving column of air, then, envelops the core of droplets, reorients all of the droplets in a columnar manner, and projects the column of air and protected uniformly and selectively sized spray droplets in a powerful high volume movement at selected low-to-medium velocity from the mouth of the sprayer unit. The combination of fan and controlled droplet atomization proximate to emission from the blower results in a simple, wide mouth spray unit useful in single and multiple unit forms to allow optimum control over droplet size, parallelism of droplet particles with columnar envelopment and amazingly sustained projection. Excellent control over fan performance within the low and medium velocities is obtained and this results in maximum field flexibility in adaptation, directionalizing and even while focusing the structure of the spray rig to accommodate particular crops, foliage, terrain, and speeds. A bonus effect is observed particularly in orchards where the sustained powerful columnar projection permits sudden dispersion of the parallel moving particles upon impingement with foliage, limbs and fruit to the point of achieving a fixing impact of droplets on all surfaces of the target and with minimal masking effect.

An improved extension of controlled droplet spraying is the consequence. The potential of attendant economies in use of minimum power, achievement of maximum coverage and improved deposition upon the targets using minimum active ingredients per unit of area is substantially advanced.

Hence, the objects of the present invention are in the achievements of improved effectiveness and demonstrable economy in spray practice; a better and simpler spray unit for projection of controlled droplet application; and extreme simplification of drive and controls with flexible usage of the units in the field for a variety of applications in orchards, vineyards, row crops, and close-to-the surface crops. Other objects and advantages will be increasingly obvious to those skilled in the art as the description proceeds.

GENERAL DESCRIPTION

In general, a spray unit is provided which can be directionalized and adjusted for substantially all agricultural spray utilization. The spray unit comprises a powered, high volume, low-to-medium velocity crossflow vortex fan, the fan having a delivery throat through which a high volume of low-to-medium velocity air moves in a parallel columnar manner. A controlled droplet atomizer is located in the delivery throat and is adjustably positioned to generate selective sized droplets of spray in a generating plane parallel to the airflow in the delivery throat and the column of air envelopes the droplets and protectively projects the droplets from the fan to a target or target area.

The combination of elongate rotor or impeller in a relatively simple scroll configured elongate case, as in the U.S. Pat. No. 3,232,522 to Laing, achieves at selected speeds of rotation a high volume delivery of air at low-to-medium velocities in which the air is moved through the fan structure in a parallel direction and orientation and without the intense turbulence produced by the other fans, particularly if the other fans or blowers are functioning at extremely high speeds and velocities. In the latter type fans, the air is in a turbulent condition as it is moved by such fans. In the crossflow vortex fan, the airflow is smooth, nonturbulent and with relatively even velocity through the entire column. Operation of such crossflow vortex fans requires substantially less power to drive than centrifugal and high velocity airflow generators and the quality of the columnar product of moving air is desirable in obtaining a projection of spray droplets.

The fan used in the present invention is a wide mouthed fan with rectilinear confinement of the parallel moving air from the impeller to create a distinct columnar movement of air at emission from the fan. The controlled droplet atomizers found in the throats of each fan are powered, can be individually controlled and are of a type generally seen in the work of Bals and others exemplified in U.S. Pat. No. 4,225,084. These controlled droplet atomizer devices rotate to provide a climbing movement of liquid material to be sprayed which moves up the rotating and usually grooved surfaces so that at emission from the controlled droplet atomizers, the particles or droplets are relatively and uniform at a selected size dependent upon selected rotational speed, characteristics of the atomizer and the material sprayed (such as viscosity, specific gravity and dilution) and the pumping rate of the actual spray materials or ingredients. The atomizers generate the droplets, sized as selected, in a planar pattern radially emanating from each atomizer and transverse of the principal axis of the atomizer. The emission from the atomizers may be tangential to the rotation of the atomizer but the plane of droplets, as generated, extends radially from the atomizer. The extent of projection of the droplets from the atomizer depends upon the volume and velocities of the air moving in the throat of the fan since the atomizers or generators project into the throat of the fan and depend thereinto. The location and number of atomizers in each fan throat is selected so that at the spraying speed of the fan the spray droplets do not impinge upon the fan surfaces and the fraction of projected droplets moving toward the impeller or rotor are reversed in flow direction and the rearwardly projected fractions join the airflow in a core-like manner within the moving air column. The airflow interfacing with the wide throat and mouth confine the spray particles or droplets from contact with the fan surfaces so as to project the spray with unusual power and definition from the wide mouth of fan toward the selected targets.

Plural of the spray units are attached to an articulating frame and boom structure in which each spray unit can be oriented for particular spray applications as, for example, horizontal disposition for ground and row crops, vertical and canted orientation for trees, orchards and bushes. Each unit is powered, each unit is movable in respect to the next. The boom structure of unit frames, articulating joints, and actuators, is operably mounted on a wheeled carriage. The carriage provides the element of portability for the spray units and carries the entire power pack, pumps, motors, spray reservoirs, tanks (fuel and hydraulic), and control elements needed to drive and adjust one or all of the spray units and to select the orientation of the units on the boom. Each spray unit is provided with adjustment means for directional rotation of the unit around the axis of the fan.

The preferred power means is hydraulic to provide good remote control and flexibility. A drive motor, for example gasoline or diesel, drives all of the necessary pumps for the spray material, for driving the motors for the atomizers, for the motors driving the fans, for the orienting cylinders used in articulation of the frame-boom structure and for auxiliary power as may be needed where the carriage is, itself, powered and steerable. The structure described is a towed structure. The hydraulic controls simplify and centralize the control location so that an operator can adjust substantially all units from a single station. Flexible lines and conduit connect the pumps to the motors and drive cylinders allowing selective control through attenuation of speeds, feeds and settings.

IN THE DRAWINGS

FIG. 5 is a somewhat schematic perspective view shaded to indicate the projected core of droplets shielded from dispersion by the surrounding and projecting columnar air blast of the tangential fan after emission.

FIG. 6 is an end elevation view of the tangential vortex or crossflow fan element of the present invention secured to a boom frame and limitedly rotatable around the fan blade axis for adjustment of the direction of emitted air and controlled size droplets.

FIG. 7 is an hydraulic, partially schematic, diagram and indicating the delivery of spray material (active ingredients and carrier with diluent or additives) to the controlled droplet atomizers or generators.

FIG. 9 is a front elevation view of the carriage supporting the spray units of the present invention and with the units articulated by actuating cylinders as desired and all three units in individual frames articulated to form a desired targeting pattern for spray projection.

FIG. 10 is a front elevation view of the carriage supporting the spray units as in FIG. 9 but indicating the articulation or orientation of the machine boom to the vertical and horizontal extremes. From these positions the boom may be oriented parallel to the line of travel of the wheeled carriage and is then in travelling position.

SPECIFIC DESCRIPTION

Figure 1:
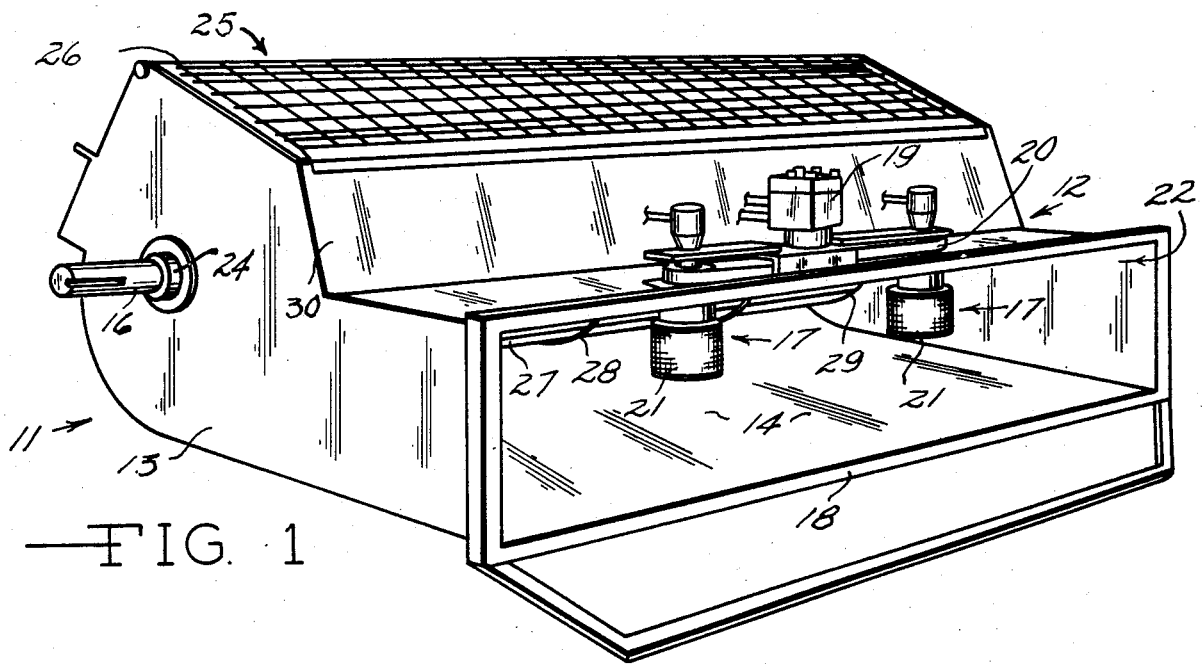
FIG. 1 is a perspective view of a spray unit for controlled droplet atomizers in accord with the present invention and indicating a tangential vortex crossflow fan with a pair of controlled droplet atomizers in the throat of the fan located in spaced-apart relation from each other and upstream of the mouth or wide emission opening of the fan.

Referring to the drawings and with first specificity to the FIG. 1, a spray unit 11 in accord with the present invention is first appreciated. The spray unit 11 includes a low-to-medium velocity crossflow or vortex fan or blower 12 with an outer scroll casing 13, a throat portion 14, a rotor or impeller 15 on drive shaft 16, one or more powered atomizers 17 of the controlled droplet type and the entire unit is supported on the frame 18. The frame 18 provides structural support and rigidity for the individual spray units 11 and permits plural units 11 to be hingedly articulated in end-to-end relationship and to be rotated on the axis of the shaft 16 and impeller 15 for further individual directionalization, as will be seen. Each unit 11 is separately driven by the motors (not shown) connected to the shaft 16 in FIG. 1. The atomizer drive motor 19 is secured to the casing 13 of fan 12 and drives the atomizer or spray generators 17 as by the drive belts 20 to rotate the drive shafts of the atomizers 17. As can be seen, the generator head portions 21 of the atomizers 17 project and depend (as shown) into the throat 14 of the fan or blower 12 and upstream of the wide mouth or emission opening 22 of the fan or blower 12. The axis of the atomizers or droplet generators 17 is adjustable, as will be seen, so that each atomizer 17 generates a radially disposed planar region of droplets in the throat 14 without droplet impingement on the walls of casing 13 or throat 14 of the fan 12 while exposed to the columnar movement of air from the impeller 15 and through the throat 14. As will be understood, the coluimn of air sweeps the droplets which are generated into a core or zone of droplets delivered out of the throat 14 and the wide mouth 22 in parallel entrainment and buffered from contact with the parts of fan 12.

The width of the mouth 22 is generally determined by the length of the impeller 15. The height of the mouth 22 is established to suit the capacity ranges of the fan 12 in respect to the high volume and selected low-to-medium velocities. The throat 14 is designed to receive the relatively nonturbulent air, as delivered from the impeller 15, and to level or equalize the velocities across the throat and through the planar zone of generated droplets to achieve the sweep of the droplets into a core and the core is given direction by the columnar movement of nonturbulent air proceeding parallel to the throat direction and the droplet generating plane and to and through the mouth 22.

The spray material reaches the atomizers 17 via the supply lines 23 connected to a spray reservoir remote from the unit 11. The impeller 15 is very simply positioned in the casing 13 turning and supported on bearings 24 located at both ends of the casing 13. Ingress of air to the impeller 15 is via the elongate air intake opening 25 and covered by the screen 26 which prevents entrainment of objectionable debris to the impeller 15. The opening 25 is sized generally equal to or exceeding the wide mouth 22. As will be seen, the rotor or impeller 15 runs the length of the case 13 and has the appearance of an open cylinder with the blades 27 being generally radially disposed and longitudinally cupped defining the outer perimeter and running the length of the rotor 15 with spaced-apart intermediate ring supports 28 intermediate the end disc plates 29. As the rotor or impeller 15 is turned, a vortex of air is generated substantially within the cylinder loosely defined by the blades 27 and is delivered by the blades 27 (in horizontal spaced-apart relation as indicated) into the throat 14 at low-to-medium velocities and at relatively high volumes. The screened opening 25 provides ample replenishment of air to the impeller 15. The reinforcing plate 30 connected to the scroll case portion 13 and the top of the throat 14 (as shown) provides reinforcement and structural integrity to the housing or case 13 and throat 14 of the fan 12. With the frame 18, the plate 30 rigidifies and allows extension of the length of the units 11. The stark simplicity of the fan 12 and unit 11 is readily appreciated and it is economical to build.

Figure 2:
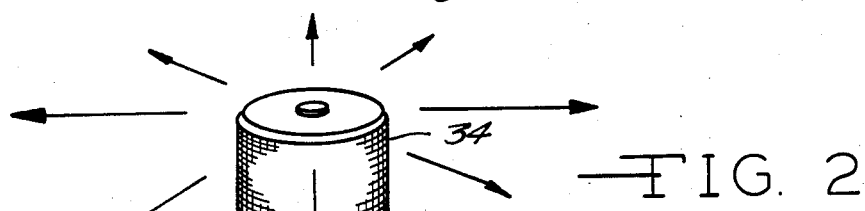
FIG. 2 is a perspective view of a controlled droplet atomizer of the type seen in the fan of FIG. 1 and the radial lines with arrows indicate the generating plane for the radially generated and tangentially diffused controlled droplets substantially adjacent the diffusion end of the generator.

By reference to the FIG. 2, a controlled droplet atomizer 17 is shown detached from the insertion into the fan 12 of FIG. 1. The device is an atomizer in general accord with the teachings of Bals in U.S. Pat. No. 4,225,084 and others and the description thereof is incorporated here by reference. The atomizer drive shaft is drivably connected to the pulley or drive sheave 31 and this spins the internal mechanism with spray material feeding through the supply line 23 and through a conduit into shaft 32. The spray material climbs a whirling spray generating structure internally to emission with the spray head 33 enclosed by an open mesh screen 34. The droplets of spray sized by the speed and adjustment of the atomizer 17 are radially flung from the head 33 as indicated by the force arrows in a planar pattern surrounding the head 33. The emanation of the droplets in the plane are primarily diffused adjacent the ends of the screen 34 most remote from the driven and feed end of the atomizers 17. It will be appreciated that in FIG. 2 the atomizer 17 is inverted from the working position shown in the FIG. 1 where the driven and feed end of the atomizer 17 is outside the throat 14 while the generating head projects (as shown) into the throat 14 of the fan 11 so that generation of the planar radial mass of droplets is proximate to the midpoint between the upper and lower throat surfaces in the throat 14. They are also located intermediate the ends of the casing 13 adjusted so that substantially no spray or droplets impact the walls of the casing 13. As shown in FIG. 1, the head 33 depends into the throat 14.

Figure 3:
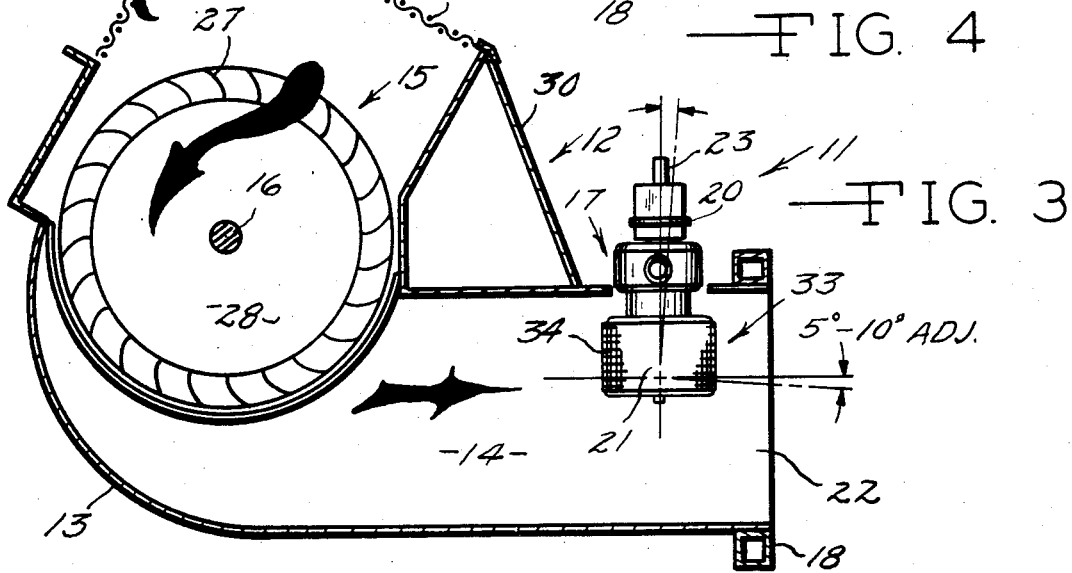
FIG. 3 is a full cross section elevation view taken through the fan and spray unit of FIG. 1 intermediate the controlled droplet atomizers and indicating the drive motor. This FIG. 3 also shows the tilt adjustment of the axis of the controlled droplet atomizers and their preferred position in the throat of the fan.

The cross section of FIG. 3 assists in visualizing the interior of the fan 12 and the simplicity of the rotor or impeller 15 on its driven shaft 16 supporting the plural blades 27 by the end discs 29 and the intermediate ring supports 28 into which the blades 27 are fitted. As indicated by the flow arrows, air enters the case 13 through the opening 25, penetrates the cylindrical array of blades 27 and is emitted into the throat portion 14 in a defined column moving parallel to the throat 14 in a relatively nonturbulent manner and at fairly uniform velocities across the throat 14 in relatively high volume where it entrains and envelopes the droplets generated from the atomizers 17, placing all droplets in a parallel orientation with flow and emitting the whole unit 11 as a moving column from the mouth 22. The reinforcement aspect of the plate 30 to the fan 12 is better appreciated in the FIG. 3.

Figure 4:
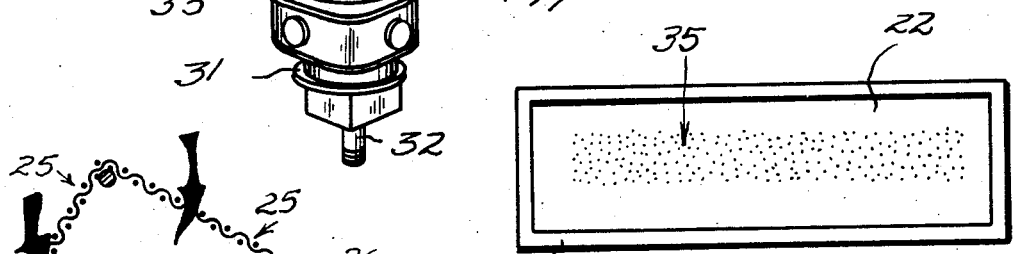
FIG. 4 is a full front view of the wide mouth or emission port of the fan under spray emitting conditions and indicating, somewhat schematically, the encapsulated planar core of the atomized droplets and the droplets substantially isolated from contact with the fan surfaces as the cushion of air projects and confines the sized spray particles.

In the FIG. 4, the mouth 22 of the fan 12 is defined by the frame 18 in a rectangular lip-like manner. At emission, the droplet core 35 is seen buffered on all sides by the parallel moving air and the core 35 is swept along in the force column 36 leaving the mouth 21 of the unit 11.

The FIG. 5, somewhat schematized to illustrate the force column 36, includes the continuously produced core 35 of selectively sized spray droplets. Surrounding the core 35 is an enveloping and protecting blanket of moving air 37. The stylized arrow point indicates the direction of movement of the force column 36 and indicates the directionalizing integrity of the column 36 and especially the core of agricultural spray 35 as it approaches a target remote from the spray unit 11. On impact with the target, the resistance breaks the column 36 and the core 35 is deflected in a manner to coat all surfaces of the target since the active spray droplets are accurate, placid and sized.

The force column 36 establishes a trajectory for the core 35 that is protective during projection of the core of droplets 35 and against premature dispersion and loss of active ingredients to the environment. The column 36 is powerful and well-defined by visual observation and the definition between ambient air and the moving column 36 is well-defined at distances of 45 to 50 feet from the mouth 22. The particles of spray as uniform droplets are oriented in parallel paths carrying the inertial force and orientation upon leaving the mouth 22 of the spray unit 11 without serious dissipation. By contrast, prior art spray units cause random movement of particles without the protection of the blanket or cushion of air 37. Their dissipation and diffusion starts at the mouth of the spray unit 11.

The FIG. 6 is an end or profile view of one of the spray units 11 connected to its drive motor 38 which is drivably connected to the fan 12 as by the drive belt 39 which connects to the shaft 16 via the drive and driven pulleys 40 and 41.

The motor 38 illustrated is an hydraulic motor and the powering hydraulic fluid is fed to and from the motor 38 through the hydraulic lines 42 and 43. It will be observed that the location of the drive axis of the motor 38 is on a radius extending from the shaft 16 supported in the bearing 24 so that the fan 12 can be directionally rotated on the bearing 24 in selected directional orientation of the mouth 22 and throat 14. This is achieved by the threaded crank arm 44 rotational in the pivotal socket 45 and operatively threaded into the pivotal nut 46 on rocker arm 47 which is an extension of the case 13 at the shaft 16 whereby the entire fan 12 is selectively rotatable on the frame or base 48. The frame or base 48, as will be seen, admits of hinged articulation as between adjacent spray units 11.

It will be appreciated that, while hydraulic motors 38 are preferred, they may be directly coupled to the shaft 16 for driving the fan 12 or they may be electric, pneumatic, or internal combustion type motors so long as they are speed controllable and accommodate flexibility in the power transmission, as will be seen. Similarly, hydraulic motors are preferred for driving the atomizers 17 (not shown in FIG. 6). One hydraulic motor 19 can drive plural atomizers 17 for controlled droplet generation in each unit 11. It will be understood that electric, pneumatic, combustion engine or other power means can also be used without departure from the spirit of the present invention.

By reference to the FIG. 7, the delivery of the agricultural spray material 50 to the atomizers 17 can be appreciated as paired in three separate spray units 11. A spray reservoir 51 is provided. The spray material 50 is in the form of a liquid containing dispersed chemical or biological ingredients in a suitable solvent or vehicle such as water, oils, or other liquid mixes of materials in accord with desired application as fungicides, insecticides, pesticides, fertilizers, systemic addatives, growth modifiers, or the like, as found requiring spray application in agricultural and horticultural environments.

From the reservoir 51, the main delivery line 52 runs to and through a filter 53 and to the intake side of a pump 54 driven by a motor 55. The pump 54 delivers the spray material 50 from its high pressure side continuing in the main line 52 to a return bypass line 56 which includes the valve 57 and back to the reservoir 51. The main line 52 continues through the shutoff valve 58. When the valve 58 is closed, the spray material 50 can circulate back to the tank or reservoir 51 provided the bypass line 56 is open at the valve 57. After valve 58, the main line 52 connects with a second valved bypass return line 59 which is also operably connected in flow relation to the reservoir 51. The valve 60 can be regarded as a throttle valve adjusting the working pressure in the continuing main line 52. A read-out gauge 61 allows monitoring of the pressure in the main line 52 when delivery of the spray material 50 extends to supplying the atomizers 17. The main line 52 distributes the spray material to the header line 62. The header line 62 and connecting tubing 63, to the supply lines 23 of the atomizers 17, are flexible to permit directing adjustment of the units 11 and articulation of the spray units 11 as between each other, as will be seen. Thus, volume and pressure control of supplied spray material 50 is very simply achieved to optimize selection of droplet size when combined with driving speed of the atomizers 17. The header 62, tubing 63 with the supply lines 23 are arranged to provide uniform flow of spray material 50 to all atomizers 17. Valves 64 at each atomizer provide for fine tuning or shutoff of each atomizer 17. While the valves and monitoring gauges constitute the control means, the valves, as described, may be automated and remotely controlled and the remote control may include a selectively programmable system as is well known in the control art and the manual valves, as shown, are schematic located and operative.

Figure 8:
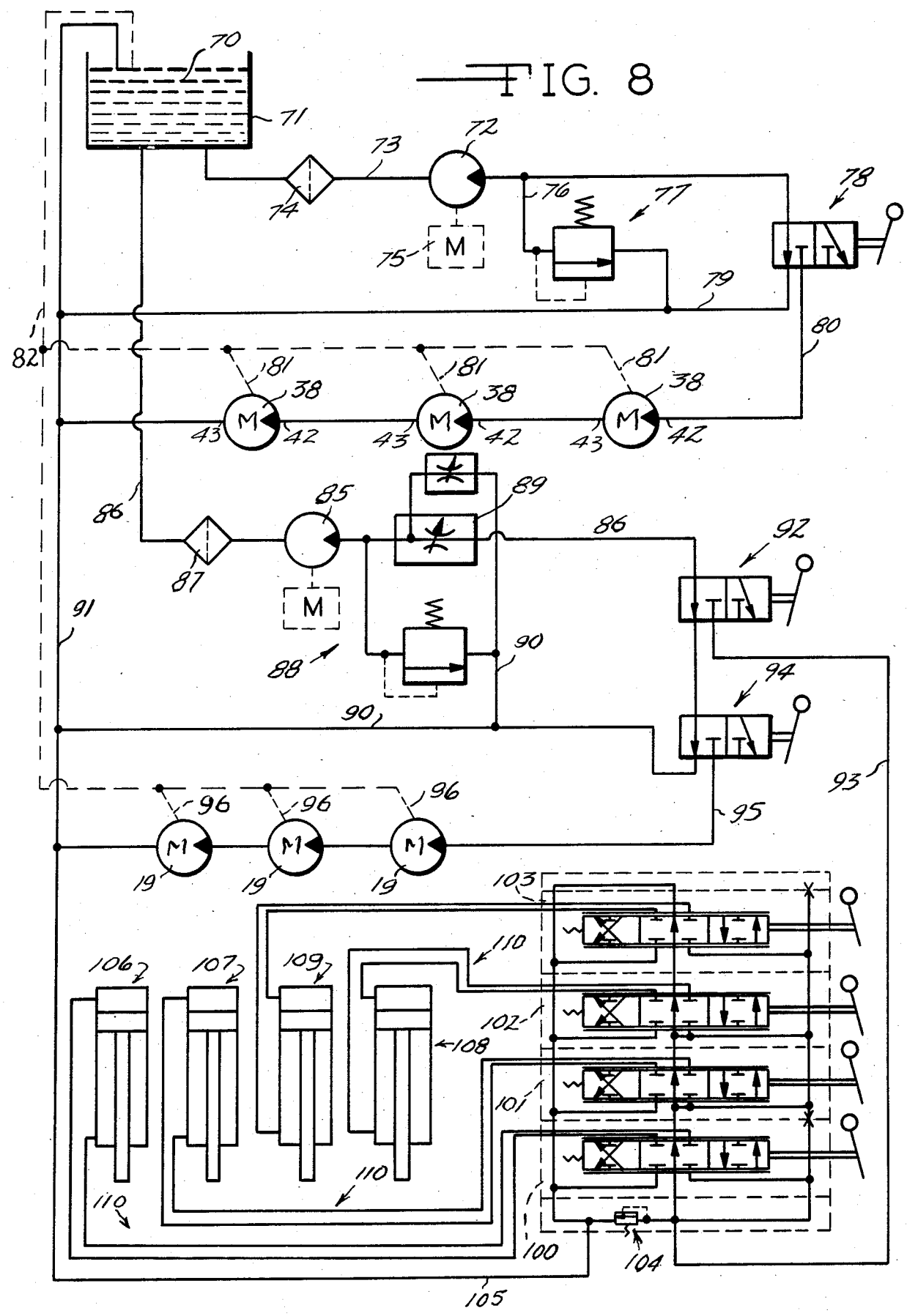
FIG. 8 is an hydraulic circuit diagram indicating the powering of the vortex fan, the controlled droplet atomizer or generators and the selective control of the boom manipulating power cylinders for articulated orientation of the spray units.

Referring to the FIG. 8, the preferred hydraulics of the plural spray units 11 are easily appreciated to drive the fans 12, to drive the motors 19 for atomizers 17, and to control the articulating of the spray units 11, as will be seen. This achieves extended flexibility by using flexible supply lines which can accommodate the directionalization of the units 11 and the articulation as between them. Hydraulic fluid 70 is provided in tank 71 which is open to the atmosphere. The tank 71 is in flow communication with the high pressure pump 72 through the hydraulic main line 73. The pump 72 and circuit is protected by the filter 74. The motor 75 is operably and drivably connected to the pump 72. The hydraulic fluid 70 moves from the pump 72 past the valved bypass line 76 which returns to the tank 70 in accord with the selectively set pressure relief valve 77. Otherwise, the main line 73 delivers the fluid to the two-way valve 78 shown dumping to tank in the bypass line 79. Upon shifting the valve 78, the hydraulic fluid 70 enters the drive line 80 and thence to and operably through the hydraulic fan motors 38 through their hydraulic supply and return lines 42 and 43 shown as serving three of the spray units 11. Then the hydraulic fluid 70 returns to the tank 71. Case drain vents 81 on each motor also dump to tank at atmospheric pressure through vent return line 82.

Motor driven pump 85 utilizes the same tank or reservoir 71 and receives hydraulic fluid 70 from the tank connected actuator main line 86 passed through the filter 87. The pumped hydraulic fluid 70 runs in the main 86 to and through a pressure controlled bypass 88 and a variable pressure flow control valve 89 with pressure controlled bypass 90 to tank 70 through return line 91. The pressure controlled fluid 70 in the main 86 goes, then, to the two-way control valve 92 for optional selected routing to the lineal actuator line 93 or the valve 94 in control of the atomizer drive motors 19. With the valve 94 positioned as shown, the fluid 70 is bypassed through return lines 90 and 91 to the tank 71 and the atomizer motors 19 do not operate. However, by shifting the two-way valve 94, the motors 19 are actuated through motor line 95 and fluid 70 is returned to the tank 71 through the return line 91. The case drain vent lines 96 dump to the atmospheric pressure line 82 to tank 71.

The linear actuator supply line 93 feeds to the four banked, three-position, four-way valves 100, 101, 102, and 103 and the pressure relief valve 104 serves as a dump to tank 71 from the actuator supply 93 and the return line 105 extending to the tank return line 91 is also a collector for dumping fluid 70 from each of the valves 100, 101, 102, and 103. As will be seen, each of the actuators 106, 107, 108, and 109 are double-acting cylinders. The actuator 106 is for transport positioning and vertical tilt and is served by the control valve 100. This unit erects the entire boom of plural units 11, as will be seen, or lowers it into horizontal and carrying position. The actuator 107 is for articulating rotation of the first one of the three spray units 11 in a boom and the actuator 107 is controlled by the manipulation of the valve 101. The actuator 108 is for the third spray unit 11 articulation and its operation is controlled by the valve 102. The actuator 109 is for articulating movement of the second spray unit 11 relative to boom rotation by movement of the first spray unit 11 and its function is controlled by the valve 103. The fluid delivery lines 110 reaching from the respective valves 100, 101, 102, and 103 to actuators 106, 107, 108, and 109 are flexible hydraulic lines for easy bundling and routing to the specific use locations. All valving shown in the FIG. 8 may be directly or remotely controlled and the controls may be computer programmed for selected settings, as desired. As shown, the valves are manually and selectively controllable.

In FIGS. 9 and 10 the boom 120 (comprising plural connected spray units 11) is appreciated and mounted on a wheeled carriage 121. It will be readily appreciated that units 11 are adjustable in their relationship to each other and around each fan axis. Each fan 12 in each spray unit 11 is individually driven by the motors 38 and the atomizers 17 are powered by the motors 20 (previously described). In the FIG. 9 the spray units 11 are directed downwardly in a converging array, as shown, and the actuators 106, 107, 108, and 109 are shown as used in manipulating the entire boom 120 together and each of the units 11 in the boom 120 being movable relative to each other. The main boom pivot 122 is centered between and over the wheels 123 and on the carriage 121. The actuator 106 extends and lowers the entire boom 120 from and onto its carrying position resting on the rest bars 124 and 125 of the carriage 121. This actuator 106 levels the boom 120 to horizontal position (full line in FIG. 10); to vertical position A (phantom line in FIG. 10); and to any selected intermediate position. In carrying position, the boom 120 is turned 90° from the horizontal position (FIG. 10) to a substantially horizontal carrying position with the boom 120 extending (not shown) longitudinally of the carriage 121. The articulating actuators 107, 108, and 109, previously described in the circuit diagram of FIG. 8, act to move the units 11 in the boom 120 on the respective hinges 126 in respect to each other so as to achieve any selected directional deviation within the boom 120 as between full horizontal and full vertical (A) orientation. This is especially useful in working with various agricultrual subjects as surface crops (horizontal), bushes and shrubs (arcuate) and orchards (vertical and focused (as converging) deviations from vertical). The conduits of hydraulic fluid and spray material supply lines are flexible and move to accommodate selected position adjustment as can be appreciated. In the FIGS. 9 and 10, the carriage 121 is intended for towing. It is within the contemplation of the invention that the units 11 may be on a self-powered and steered carriage and where the single operator would select the desired adjustments and directionalization would occur from an operator console within a cab, for example.

Figure 11:
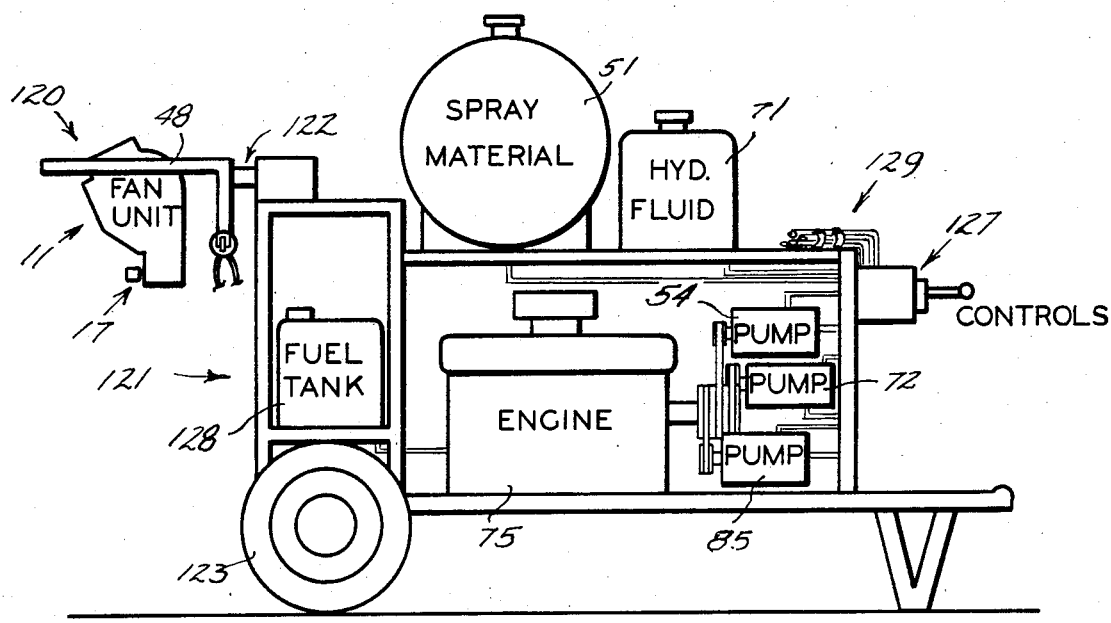
FIG. 11 is a side elevational view of the carriage and spray rig of FIG. 10 and somewhat schematized to indicate the location of the principal elements in the power package and supported by the wheeled carriage.

The FIG. 11 indicates the character of the carriage 121 in side elevation to indicate that in the FIGS. 9 and 10 the carriage 121 carries a power plant 75 which powers the pump 54 (for spray delivery), the pump 72 (for driving the vortex fans 12 in the units 11), and the pump 85 driving the atomizers 17 and the actuators 106, 107, 108, and 109, as required. A control console 127 serves the power plant 75 and substantially all of the adjustment means for the spray units 11 as set out in the hydraulic diagrams in FIGS. 7 and 8. The fuel tank 128 feeds the internal combustion engine 75. Bundled flexible conduit 129 runs from the console manifolds to the remotely driven components, as described.

In operation, the spray units 11 perform well in the generation and projection of spray material in a manner not previously available at low-to-medium pressures and at high volumes. They minimize losses to the ambient surroundings and thus extend the coverage of the spray material to agricultural subjects or targets. The spray units 11 are light in weight and thus admit of ganging or plural boom groupings, each unit 11 being individually adjustable. Since the low pressure vortex type fans of the units are simple in construction, the vortex or crossflow fans 12 are economical to manufacture and economical to operate and repair. Because the parallel orientation protects the enveloped sized droplets and avoids impingement on the fans 12, throats 14, and mouths 22, the projection without waste to the target is extended efficiently. Finally, the impact of the spray at the target area is such as to surmount masking and the targets are coated on all sides, for example, allowing a row of trees in an orchard to be sprayed from one side and with coverage as if the trees had been sprayed on both sides. Droplet sizing and delivery conditions are easily adjusted to accommodate the field encountered conditions and optimum performance.

Having thus described our invention and the preferred embodiment thereof, others may perceive improvements, changes and modifications therein and such improvements, changes and modifications within the skill of the art are intended to be included herein, subject to the limitations of our hereinafter appended claims.

We claim:

1. A spray unit for controlled droplet projection comprising:
    a powered, high volume, low-to-medium velocity crossflow vortex fan;
    a delivery throat in said fan through which high volume, low-to-medium velocity air moves in a parallel columnar manner; and
    a controlled droplet atomizer located in said delivery throat and generating a core of droplets in a plane substantially parallel to said airflow in said delivery throat, the air enveloping said core of droplets and projecting said core of droplets from said fan.

2. A spray unit for controlled droplet projection comprising:
    a powered, high volume, low-to-medium velocity fan;
    means included in said fan for diminution of turbulence prior to columnar movement and emission whereby air moves in a substantially parallel uniform direction at emission; and
    at least one powered, controlled droplet atomization structure in said fan generating controlled droplets of spray material in a plane generally parallel to the columnar movement of air whereby said droplets are entrained, propelled and projected from said fan at selected low-to-medium velocities carried as a core of droplets in substantially parallel nonturbulent manner by said air.

3. A spray unit for controlled droplet projection comprising:
    a low-to-medium velocity, high volume powered, wide mouth fan providing a columnar, high volume, medium velocity nonturbulent flow of air; and
    at least one powered, controlled droplet atomizer oriented in said fan and adjacent said mouth thereof and generating droplets of spray in a plane substantially parallel to the column of substantially nonturbulent moving air whereby said generated droplets in said air in avoidance of impinging against the interior surfaces of said fan and said droplets are oriented, entrained, surrounded, propelled and projected from said fan at selected low-to-medium velocities with said air.

4. In the structure of claim 3 wherein plural of said fans and included atomizers are supported on an hydraulically manipulated articulated boom and said boom is operably and directionally connected to a movable carriage which includes a power source, a spray reservoir and flexible conduit means connected to and driving said fans and said atomizers, and means adjusting the drive speed of said fans and said atomizers in control of droplet size and the flow of spray material to said atomizers.

5. A multiple unit spray rig for directionalized, controlled droplet projection at low-to-medium velocities comprising:
    plural spray units each comprising a powered, wide mouth, high volume, low-to-medium velocity crossflow vortex fan and each of said spray units having at least one powered, controlled droplet atomizer in the throats of each of said fans, and between the impeller thereof and the mouth of said fan, said atomizers adjustably mounted to generate droplets of spray material at controlled sizes in a plane substantially parallel to and within the column of air moving through said throat of said fan;
    a frame connected to each of said units, each frame having hinge means therebetween and adjusting means on each frame connected to said fans selectively positioning said fans directionally around the axis of the impeller of each of said fans;

power means on each of said frames and operably connected to respective of said fans;

power means between said units and acting at each said hinge adjusting the alignment of said units from parallel end-to-end relation to an angular articulated displacement permitted by said hinges and said power means;

extendable and retractable piston means connected operably to said frames and acting on all of said power means, frames, and units as a boom manipulable within the limits of said piston;

a wheeled carriage supporting said units for transport and use and including equipment such as motors, pumps, hydraulic fluid source, spray material reservoir, fuel supply and control means for said units, said booms and said spray materials and conduit lines from said equipment to operative connection at said fans, said atomizers and said power and piston means; and flexible conduit lines from said equipment to said units, atomizers, piston and power means between said units in full control of droplet size, spray volumes, and fan velocities.

6. A spray procedure for projecting controlled droplets comprising:

removing turbulence from a column of high volume, medium-to-low velocity air; and passing said column of air over, under and around a plane of selectively controlled droplets of active spraying ingredients, the plane being controlled parallel and central to the column of air whereby said droplets are prevented from contact with air moving apparatus and are moved in said column of air parallel to said flow and said air enveloping said droplets, said droplets carried as a core in said low velocity, high volume column of air.

* * * * *

UNITED STATES PATENT AND TRADEMARK OFFICE
CERTIFICATE OF CORRECTION

PATENT NO. : 4,659,013

DATED : April 21, 1987

INVENTOR(S) : Richard L. Ledebuhr, Gary R. Van Ee

It is certified that error appears in the above-identified patent and that said Letters Patent is hereby corrected as shown below:

FOREIGN PATENT DOCUMENTS:

411599, 4/1966, Fed. Rep. of Germany should read ---
411599, 4/1966, Switzerland ---

Column 6, line 32 "coluimn" should read --- column ---

Signed and Sealed this

Eighteenth Day of August, 1987

*Attest:*

DONALD J. QUIGG

*Attesting Officer*     *Commissioner of Patents and Trademarks*